United States Patent Office 3,227,632
Patented Jan. 4, 1966

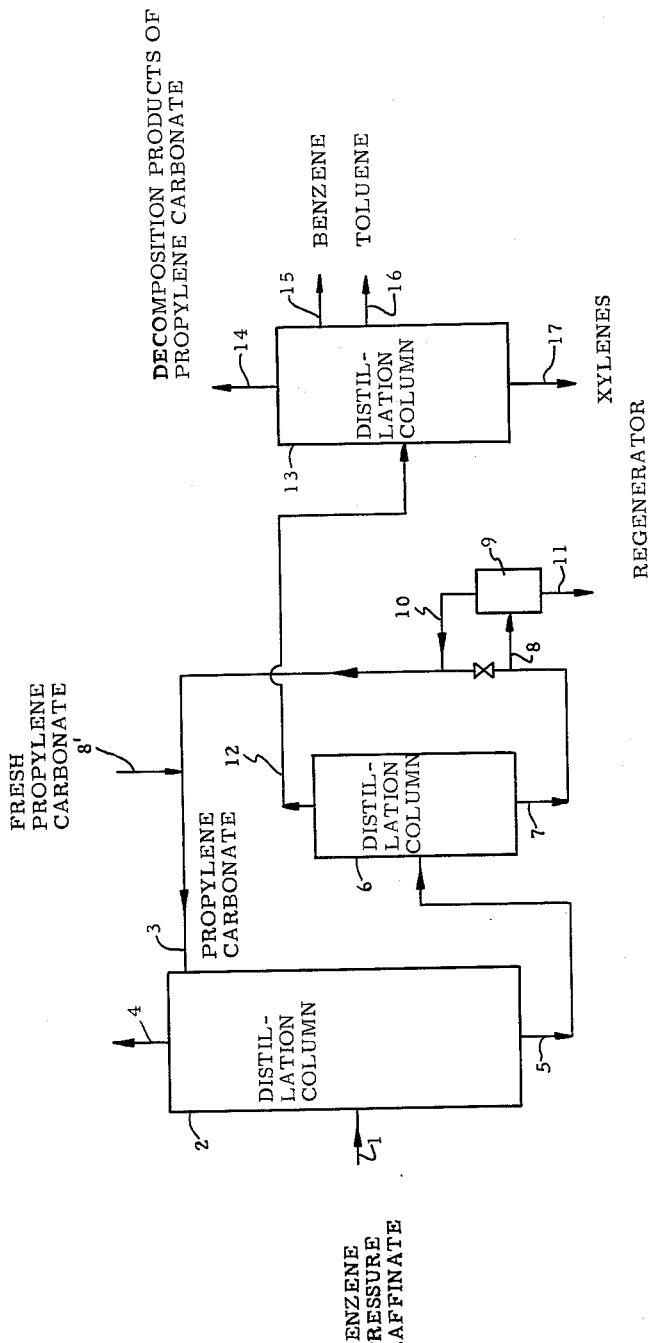

3,227,632
RECOVERY OF AROMATIC HYDROCARBON BY EXTRACTIVE DISTILLATION WITH ANHYDROUS LIQUID PROPYLENE CARBONATE
Adolph Schmalenbach and Martin Schulze, Essen, and Kurt Von Kessel, Essen-Steele, Germany, assignors, by mesne assignments, to Koppers Company, Inc., a corporation of Delaware
Filed Oct. 22, 1962, Ser. No. 232,005
3 Claims. (Cl. 203—58)

The present invention relates to a process for recovery of very pure aromatics from mixtures which contain, in addition to the aromatics, also paraffinic and naphthenic hydrocarbons, in which case a distillation process is used.

The invention consists in introducing the vaporized primary material in the middle of a distillation column and simultaneously adding at the top of the column practically anhydrous, liquid propylene carbonate in a ratio of one part by volume of aromatics in the primary material to 2–6 parts of propylene carbonate under such temperature conditions that the aromatics dissolved in the propylene carbonate are discharged from the bottom of the distillation column and the vapors of the non-aromatic hydrocarbons are removed at the head of the column; separating from the bottom product from the distillation column the aromatics in vaporous form by a simple distillation; and returning the liquid propylene carbonate for extractive distillation of additional amounts of primary material.

The use of propylene carbonate as an auxiliary agent in the recovery of aromatics from mixtures of hydorcarbons which contain non-aromatic components in addition to the aromatic is known per se. This known use of propylene carbonate consists in subjecting the primary material containing aromatics to an extraction with propylene carbonate at temperatures of about 30 to 40° C., in the course of which both the heavy phase consisting of the extracting agent and the dissolved aromatics contained therein as well as the light phase consisting of aromatics and non-aromatics are discharged from the extraction apparatus in the liquid state. Apart from the fact that complicated extraction apparatus are necessary for this type of recovery of aromatics, the known process also requires an addition of foreign materials which reduces the solubility of the propylene carbonate for aromatics in order to assure the desired degree of purity of the aromatic product under economical conditions.

The process conforming to the present invention which operates according to the principle of extractive distillation starts, in contrast to the known process, with a completely vaporized primary material from which a liquid bottom phase is formed by a contact with liquid propylene carbonate; this bottom phase contains only the aromatics in addition to the extracting agent—at best, in addition to the latter, high boiling non-aromatics in small amounts which are easily separated by distillation—whereas the non-aromatic constituents of the primary material remain in the vaporous phase and contain such small amounts of aromatics that very pure aromatics can be recovered with very high yields.

In order to maintain the losses of extracting agent low, the propylene carbonate should be as anhydrous as possible. A water content of the propylene carbonate results in a hydrolytic decomposition of the propylene carbonate at the temperatures used in the process conforming to the invention.

An apparatus for carrying out the process conforming to the invention is diagrammatically illustrated in the drawing.

The primary product containing aromatics, for example a so-called benzene pressure raffinate which consists up to about 95% of aromatics (benzene, toluene, xylenes) is supplied to the distillation column 2 through line 1 at a temperature of about 115° C. The primary material is either completely vaporized or superheated as a liquid so that upon entrance of the liquid into the column 2 a complete vaporization occurs. Liquid, anhydrous propylene carbonate at a temperature of about 120° C. is added at the top of the distillation column 2 through line 3. The amount of propylene carbonate is determined by the composition of the starting mixture. If the latter contains practically only benzene as aromatic constituent, a ratio of one part by volume of benzene to about three parts by volume of propylene carbonate is used. If the starting mixture contains toluene in addition to benzene, the ratio by volume of aromatics to propylene carbonate amounts to 1:4. When a starting material which contains benzene, toluene, and xylenes is used, as in the present case, the ratio by volume of aromatics to propylene carbonate amounts to about 1:6.

A mixture of vapors which contain the paraffins and naphthenes of the starting material as well as a small amount of aromatics, mainly benzene, is discharged from the head of the column. In the present case the proportion of aromatics in the head product amounts to about 10–20%, so that the loss of aromatics, calculated on the content of aromatics in the primary material, is in the order of magnitude of 0.5–1%. When a primary material having a lower aromatics content is charged, by suitable selection of the operating conditions of the distillation column it is possible that the percentage of aromatics contained in the vaporous head product is lower than that given above so that an extremely high yield of very pure aromatics is also obtained in this case.

The vaporous head product is discharged through line 4.

A liquid which contains the extraction agent, the pure aromatics as well as certain impurities originating from an unavoidable but slight decomposition of the extraction agent is discharged from the bottom of distillation column 2 through line 5 at a temperature of about 134° C. These decomposition products are mainly acetone and propylene oxide. The liquid phase is introduced into distillation column 6. A practically pure propylene carbonate is discharged from the bottom of the distillation column 6 through line 7 and it is recycled to the first distillation column 2 through line 3. The slight loss of propylene carbonate by the mentioned unavoidable decomposition is continuously or intermittently replaced by fresh propylene carbonate which is supplied to line 3 through line 8'.

Since certain high boiling constituents of the primary material are dissolved in the propylene carbonate upon recirculation of the propylene carbonate, a small partial stream is continuously or intermittently withdrawn from line 7 through line 8 and it is freed in a regenerator 9 from the dissolved high-boiling constituents to such an extent that no disturbance can occur in the extractive distillation by such contamination of the propylene carbonate in the system. The regenerated propylene carbonate is recycled through line 10 while the separated impurities are removed from the process through line 11.

A mixture of vapors consisting mostly of pure aromatics is discharged from distillation column 6 through line 12. In addition, this mixture of vapors also contains the mentioned decomposition products of the propylene carbonate and sometimes higher boiling paraffins and naphthenes in case the latter had been present in the primary material. The mixture of vapors is introduced into a distillation column 13 and it is fractionally distilled there. The cited decomposition products of the propylene carbonate are discharged from the head of the column 13 through line 14, while a benzene and a toluene fraction, respectively, can be withdrawn through lines 15 and 16. The bottom product of column 13 is withdrawn through line 17 and contains the xylenes which in some cases are contaminated with the cited higher boiling paraffins and naphthenes which may be easily separated by a simple distillation.

It could be established that when a starting product consisting of 95% benzene and toluene is used, the benzene fraction withdrawn through line 15 has a melting point of more 5.5° C. Thus, it is an extremely pure benzene. The toluene fraction withdrawn through line 16 has a toluene content of more than 99.9%.

Under certain circumstances it may be expedient, in the case of starting mixtures which contain benzene, toluene and xylenes, first to separate this starting mixture into several fractions which contain sometimes only one and sometimes two types of aromatics. In this case the individual fractions are then separately subjected to the extractive distillation with propylene carbonate. It also happens that there frequently exists interest for only one particular type of pure aromatic in such starting mixtures, so that of the individual fractions only that particular fraction which is desired in a special purity needs to be subjected to extractive distillation.

We claim:

1. A process for the recovery of very pure aromatic hydrocarbons from a vaporized mixture of said aromatic hydrocarbons with paraffinic and naphthenic hydrocarbons by an extractive distillation comprising introducing said vaporized mixture into the middle of a distillation column; adding at the head of said column practically anhydrous liquid propylene carbonate in a ratio by volume of two to six parts of liquid propylene carbonate to one part of aromatic hydrocarbons, contacting said vaporized mixture with said propylene carbonate in said distillation column at a temperature between 115 and 134° C. such that said aromatic hydrocarbons dissolve in said propylene carbonate and said paraffinic and naphthenic hydrocarbons are discharged through the head of said column, withdrawing said liquid propylene carbonate containing said aromatic hydrocarbons from the bottom of said column, separating said aromatic hydrocarbons from said propylene carbonate by a simple distillation and returning said liquid propylene carbonate to the head of said column for extractive distillation of additional amounts of said mixture.

2. The process as defined in claim 1 in which said mixture is separated into fractions containing essentially only one type of aromatic hydrocarbon and then subjecting these fractions individually to extractive distillation with propylene carbonates.

3. A process for the recovery of very pure aromatic hydrocarbons from a vaporized mixture of said aromatic hydrocarbons with paraffinic and naphthenic hydrocarbons by an extractive distillation comprising contacting said vaporized mixture in the middle of a distillation column with liquid propylene carbonate in a ratio by volume of two to six parts of liquid propylene carbonate to one part of aromatic hydrocarbons in said vaporized mixture at a temperature between about 115° C. and 134° C. such that said aromatic hydrocarbons dissolve in said propylene carbonate and said paraffinic and naphthenic hydrocarbons are discharged through the head of said column, withdrawing said propylene carbonate containing said paraffinic and naphthenic hydrocarbons from the bottom of said distillation column, separating the aromatic hydrocarbons from said propylene carbonate by a simple distillation and returning said propylene carbonate to said distillation column for extractive distillation of additional amounts of said mixture.

References Cited by the Examiner
UNITED STATES PATENTS

| | | | |
|---|---|---|---|
| 2,570,066 | 10/1951 | Morrow et al. | 202—39.5 |
| 2,688,645 | 9/1954 | Badertscher et al. | |
| 2,837,585 | 6/1958 | Murray et al. | |
| 2,916,497 | 12/1959 | Murray et al. | |
| 2,934,498 | 4/1960 | Nevitt | 202—39.5 |
| 2,935,470 | 5/1960 | Nevitt | 202—39.5 X |

OTHER REFERENCES

Weissberger: "Technique of Organic Chemistry-Distillation," vol. IV, 1951, N.Y. (p. 338 relied upon).

ROBERT F. BURNETT, *Primary Examiner.*

NORMAN YUDKOFF, *Examiner.*